United States Patent
Ions

(10) Patent No.: US 9,109,626 B2
(45) Date of Patent: Aug. 18, 2015

(54) BEARING SUPPORT

(75) Inventor: David Ions, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 686 days.

(21) Appl. No.: 12/707,380

(22) Filed: Feb. 17, 2010

(65) Prior Publication Data

US 2011/0044810 A1    Feb. 24, 2011

(30) Foreign Application Priority Data

Feb. 24, 2009 (GB) .................................. 0903058.6
May 12, 2009 (GB) .................................. 0908096.1

(51) Int. Cl.
| | |
|---|---|
| F01D 25/16 | (2006.01) |
| F16C 35/067 | (2006.01) |
| F04D 29/056 | (2006.01) |
| F04D 29/059 | (2006.01) |
| F16C 35/077 | (2006.01) |
| F16D 1/068 | (2006.01) |
| F16B 11/00 | (2006.01) |

(52) U.S. Cl.
CPC ............ *F16C 35/067* (2013.01); *F04D 29/059* (2013.01); *F04D 29/0563* (2013.01); *F16C 35/077* (2013.01); *F16D 1/068* (2013.01); *F16B 11/008* (2013.01); *F16C 2360/42* (2013.01)

(58) Field of Classification Search
CPC .. F16C 35/067; F16C 35/077; F16C 2360/42; F04D 29/0563; F04D 29/059; F16D 1/068; F16B 11/008

USPC ................. 415/110, 111, 142, 229; 416/174; 384/537, 584, 585
See application file for complete search history.

(56) References Cited

U.S. PATENT DOCUMENTS

| | | | | |
|---|---|---|---|---|
| 4,370,106 | A | * | 1/1983 | Lauterbach .................... 417/407 |
| 4,854,750 | A | * | 8/1989 | Lavin ............................. 384/500 |
| 5,211,531 | A | * | 5/1993 | Kakimoto ...................... 415/112 |
| 5,555,956 | A | * | 9/1996 | Voss et al. ..................... 184/6.16 |
| 6,299,358 | B1 | * | 10/2001 | Prater et al. ................... 384/537 |
| 2003/0021507 | A1 | * | 1/2003 | Hobaugh, II .................. 384/537 |
| 2003/0156773 | A1 | * | 8/2003 | Tsuchiya et al. .............. 384/537 |
| 2007/0065064 | A1 | * | 3/2007 | Kitamura et al. ............. 384/537 |
| 2008/0011266 | A1 | * | 1/2008 | Staudenmaier et al. .. 123/198 R |

(Continued)

FOREIGN PATENT DOCUMENTS

| | | |
|---|---|---|
| DE | 41 18 282 | 8/1992 |
| GB | 1174580 | 12/1969 |

(Continued)

OTHER PUBLICATIONS

International Search Report and Written Opinion mailed on May 31, 2010, directed to corresponding International Patent Application No. PCT/GB2010/050212; 11 pages.

(Continued)

*Primary Examiner* — Edward Look
*Assistant Examiner* — Aaron R Eastman
(74) *Attorney, Agent, or Firm* — Morrison & Foerster LLP

(57) ABSTRACT

A bearing support that includes a body through which a bore extends and a plurality of grooves formed in a wall of the bore. Each groove extends from a first end of the bore and terminates prior to a second end of the bore. A bearing can be secured within the bearing support by injecting adhesive into one or more of the grooves.

12 Claims, 2 Drawing Sheets

(56) References Cited

U.S. PATENT DOCUMENTS

| | | | |
|---|---|---|---|
| 2008/0019629 A1* | 1/2008 | McKeirnan | 384/493 |
| 2008/0273990 A1* | 11/2008 | Pham et al. | 417/53 |
| 2010/0172739 A1* | 7/2010 | Arnold | 415/111 |

FOREIGN PATENT DOCUMENTS

| | | | | |
|---|---|---|---|---|
| JP | 61-218893 | | 9/1986 | |
| JP | 2008002650 | * | 6/2006 | F16C 35/02 |
| JP | 2007-211960 | | 8/2007 | |
| JP | 2008-2650 | | 1/2008 | |
| NL | 8002769 | | 12/1981 | |
| WO | WO-2006/003142 | | 1/2006 | |
| WO | WO 2007/003153 | | 1/2007 | |
| WO | WO-2007/003153 | | 1/2007 | |
| WO | WO2007003153 A1 | * | 1/2007 | F04D 29/04 |

OTHER PUBLICATIONS

GB Search Report dated Jun. 2, 2009, directed to counterpart GB Patent Application No. 0903058.6; 1 page.

* cited by examiner

BEARING SUPPORT

REFERENCE TO RELATED APPLICATIONS

This application claims the priority of United Kingdom Application No. 0903058.6, filed Feb. 24, 2009 and United Kingdom Application No. 0908096.1, filed May 12, 2009, the entire contents of which are incorporated herein by reference.

FIELD OF THE INVENTION

The present invention relates to a support into which a bearing may be secured by adhesive.

BACKGROUND OF THE INVENTION

A rotor is typically mounted to a support by one or more bearings. Each bearing may be press fit into a bore within the support. However, this requires high-precision manufacturing of both the support and the bearing. As an alternative to press fitting, each bearing may be adhered within a bore of the support. However, there is often difficulty in ensuring that an even coverage of adhesive is provided between the bearing and the support. This difficulty is compounded by the fact that, once the bearing is seated within the bore, it is not easy to rotate the bearing relative to the support. Insufficient or uneven coverage of adhesive may subsequently result in failure of the adhesive.

SUMMARY OF THE INVENTION

In a first aspect, the present invention provides a bearing support comprising a body through which a bore extends and a plurality of grooves formed in a wall of the bore, each groove extending from a first end of the bore and terminating prior to a second end of the bore.

The bore is dimensioned such that, when a bearing is seated within the bore, a clearance exits between the bearing and the wall of the bore. Once the bearing is seated within the bore, adhesive may be injected into one or more of the grooves. The grooves act to deliver the adhesive to the bottom of the bore. Owing to the clearance between the bearing and the wall of the bore, the adhesive wicks around the bottom of the bore. As adhesive continues to be injected into the grooves, the adhesive rises within the bore thereby driving out any air. The result is an even distribution of adhesive between the bearing and the wall of the bore.

The term bearing is intended encompasses both a single bearing (e.g. ball bearing, needle roller bearing or double row bearing) and a plurality of bearings forming part of a single bearing assembly (e.g. a bearing cartridge).

The bore is ideally tapered towards the second end. This then has the advantage that, as the adhesive rises within the bore, the air is driven out into an expanding volume and thus the risk of air entrapment is further reduced. Furthermore, by having a tapered bore, the cured adhesive forms a wedge between the bearing and the bearing support. This wedge acts to oppose axial thrust acting on the bearing relative to the bearing support.

The wall of the bore is preferably chamfered at the first end. The chamfered portion of the bore may then serve as a reservoir for the rising adhesive. Consequently, tight controls on the volume of adhesive injected into the grooves are not required. Instead, a fixed volume of adhesive can be injected that ensures good coverage without the danger of overfilling. Furthermore, the chamfered portion provides a relatively large region over which the adhesive can be initially cured, e.g. by UV light. The cured adhesive within the chamfered portion then acts to hold the bearing to the bearing support while the remainder of the adhesive within the bore cures, e.g. anaerobically. This then removes the danger of possible movement of the bearing relative to the bearing support during curing, which might otherwise result in a weak adhesive join.

Each groove preferably extends in a direction parallel to a longitudinal axis of the bore. Consequently, any adhesive injected into a groove is quickly delivered to the bottom of the groove. By delivering adhesive quickly to the bottom of the groove, the adhesive wicks first around the bottom of the bore. As further adhesive is delivered, the adhesive then rises from the bottom of the bore, thereby minimising the risk of trapped air.

Advantageously, the bearing support comprises two grooves located on opposite sides of the bore. By providing grooves on opposite sides of the bore, adhesive may be injected into one groove, which then wicks around the bore before bleeding into the second groove. This then encourages complete coverage of adhesive between the bearing and the wall of the bore. Moreover, the adhesive process is simplified since adhesive need only be injected into one groove.

Press fitting a bearing into a bore requires high-precision manufacturing of both the bearing and the support. As such, certain materials and processes are excluded from use since it is not possible to obtain the required tolerances. In contrast, the adhesive acts to absorb manufacturing tolerances in the bearing and/or the support. Accordingly, the bearing support may be formed of plastic using, for example, injection or compression moulding.

The bearing support may comprise one or more channels that extend around the wall of the bore between adjacent grooves. For example, the bearing support may comprise a screw thread in the wall of the bore, the screw thread defining a plurality of channels between the grooves. The channels increase the surface area available to the adhesive and ideally act to roughen the surface of the wall. As a result, a stronger joint may be achieved between the bearing support and the bearing. The channels additionally provide an anchorage for the adhesive such that the adhesive joint is better able to resist axial forces acting between the bearing and the bearing support. Moreover, the channels provide passageways for the adhesive to wick around the bore such that shorter wicking times can be achieved. Each channel preferably has a depth less than that of the grooves. Accordingly, the aforementioned advantages may be obtained without unduly increasing the volume of adhesive required to form the joint between the bearing and the bearing support.

In a second aspect, the present invention provides a diffuser comprising a hub through which a bore extends and a plurality of grooves formed in a wall of the bore, each groove extending from a first end of the bore and terminating prior to a second end of the bore.

A rotor may then be adhered within the bore of the diffuser. Since the rotor is secured directly to the diffuser, accurate alignment of the rotor relative to the diffuser is made possible. In particular, the rotor may be adhered to the diffuser such that the rotor and diffuser are concentric. This in contrast to other compressors in which the rotor is not directly secured to the diffuser and thus geometric tolerances may result in misalignment of the rotor and diffuser. Additionally, the manufacture and assembly of the diffuser and rotor is made both simpler and cheaper.

The bore preferably extends from a first side of the hub to a second side of the hub, and the diffuser comprises a plurality of vanes located on the second side of the hub. Each groove then extends from the first side and terminates prior to the second side of the hub. As a result, adhesive is injected into the grooves from a side of the hub opposite to that on which the vanes are located. This has the advantage that a rotor having an impeller may be secured to the diffuser. The rotor may therefore be dynamically balanced as a complete unit before being secured to the diffuser. This is contrast to other rotor-diffuser assemblies in which the shaft of the rotor must first be secured to the diffuser and then the impeller is subsequently secured to the shaft.

The bore is ideally tapered towards the second side of the hub. Consequently, as adhesive rises within the bore, air is driven out by the adhesive into an expanding volume and thus the risk of air entrapment is reduced. Furthermore, the adhesive forms a wedge that opposes axial thrust acting on the rotor when in operation.

In a third aspect, the present invention provides an assembly comprising a bearing secured within a bearing support, the bearing support comprising a body through which a bore extends and a plurality of grooves formed in a wall of the bore, each groove extending from a first end of the bore and terminating prior to a second end of the bore, and the bearing is secured within the bore by adhesive located between the bearing and the wall and within the grooves.

The bore is dimensioned (i.e. has a particular diameter and/or degree of taper) such that a clearance exists between the bearing and the wall of the bore. The bearing is secured to the support by adhesive that fills the clearance between the bearing and the wall.

In a fourth aspect, the present invention provides a compressor comprising a rotor mounted to a diffuser, the rotor comprising a shaft to which are mounted an impeller and a bearing, and the diffuser comprises a hub through which a bore extends and a plurality of grooves are formed in a wall of the bore, each groove extending from a first end of the bore and terminating prior to a second end of the bore, wherein the bearing is secured within the bore by adhesive located between the bearing and the wall and within the grooves.

The bore is dimensioned such that a clearance exists between the bearing and the wall of the bore. By providing a clearance, the rotor and the diffuser may be accurately aligned without the need for high-precision manufacturing. The adhesive then fills the clearance between the bearing and the wall of the bore so as maintain alignment of the rotor relative to the diffuser.

The bearing is preferably a bearing cartridge comprising a pair of spaced bearings surrounded by a sleeve, and the adhesive is located between the sleeve and the wall. This then has the advantage that the rotor is supported over a relatively long length, thereby providing good stability. Moreover, the sleeve provides a relatively large surface over which the adhesive secures the rotor to the diffuser, and thus a good bond is formed between the rotor and the bearing support.

In a fifth aspect, the present invention provides a method of securing a bearing to a support, the method comprising: providing a bearing support, the bearing support comprising a body through which a bore extends and a plurality of grooves formed in a wall of the bore, each groove extending from a first end of the bore and terminating prior to a second end of the bore; inserting a bearing into the bore; and injecting adhesive into one or more of the grooves.

The bore is dimensioned such that a clearance exists between the bearing and the wall of the bore. This size of this clearance is ideally chosen so as to permit good wicking of the adhesive while simultaneously preventing the adhesive from seeping out through the bottom of the bore.

Preferably, at least one groove is precluded from adhesive injection. More preferably, for each groove into which adhesive is injected, an adjacent groove is precluded from adhesive injection. This then allows the adhesive injected into one groove to wick around the bore and bleed into an adjacent groove, thereby encouraging an even distribution of adhesive.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
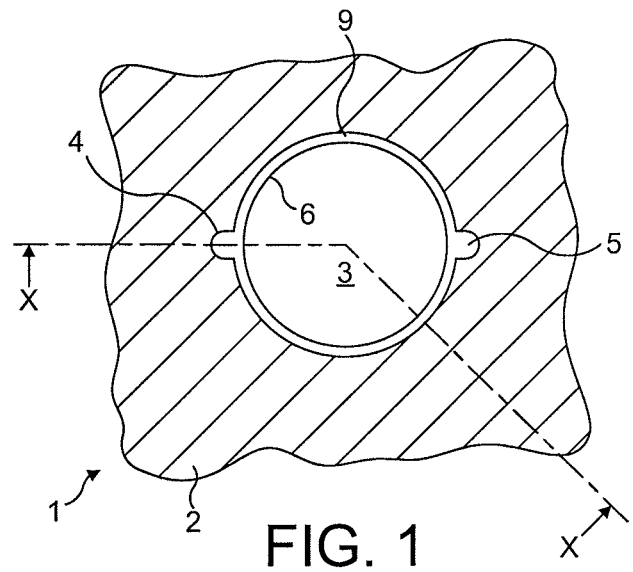
FIG. 1 is a plan view of a bearing support in accordance with the present invention.
Figure 2:
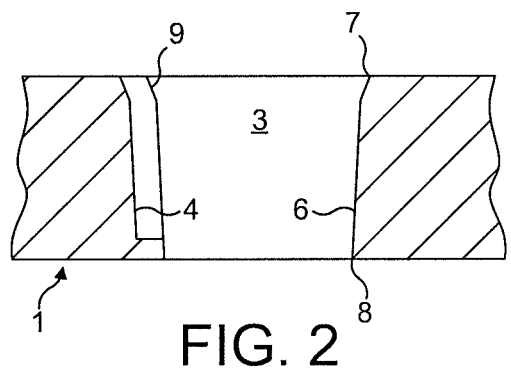
FIG. 2 is a sectional view of the bearing support of FIG. 1 along the line X-X.

The bearing support 1 of FIGS. 1 and 2 comprises a main body 2 through which a bore 3 extends. A pair of grooves 4,5 are formed along a wall 6 of the bore 3. The grooves 4,5 are located on opposite sides of the bore 3 and extend linearly in a direction parallel to the longitudinal axis of the bore 3. Moreover, each groove 4,5 extends from a first end 7 of the bore 3 and terminates prior to a second, opposite end 8 of the bore 3. Consequently, each groove 4,5 does not extend along the full length of the bore 3 but is instead closed at one end.

The bore 3 is tapered towards the second end 8, i.e. the diameter of the bore 3 at the first end 5 is greater than that at the second end 6. Additionally, the wall 6 of the bore 3 is chamfered 9 at the first end 7.

A method of securing of a bearing within the bearing support 1 will now be described with reference to FIG. 3.

Figure 3:
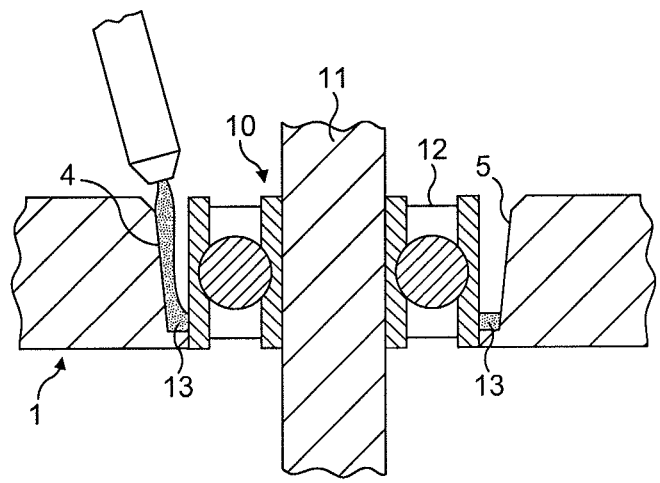
FIG. 3 is a sectional view of a rotor secured within the bearing support of FIGS. 1 and 2.

FIG. 3 illustrates a rotor 10 comprising a shaft 11 to which a bearing 12 is mounted. Although not shown, the shaft 11 of the rotor 10 is held in one half of a jig and the bearing support 1 is held in another half of the jig. The two halves of the jig are brought together such that the rotor 10 extends through the bearing support 1 and the bearing 12 is seated within the bore 3 of the support 1, as is illustrated in FIG. 3. The two halves of the jig are aligned so as to ensure accurate alignment of the rotor 10 within the bearing support 1. The bore 3 is dimensioned (i.e. has a particular diameter and degree of taper) such that a clearance is achieved between the wall 6 of the bore 3 and the bearing 12, the importance of which is described below.

After the two halves of the jig have been brought together, adhesive 13 is injected into the open top of the first groove 4. The adhesive is a UV-curable anaerobic adhesive; however, alternative adhesives might equally be used. Under the influence of gravity, the adhesive 13 flows down to the closed end of the groove 4. From here, the adhesive 13 wicks between the bearing 12 and the wall 6 of the bore 3. The adhesive 13 wicks around the bottom of the bore 3 from the first groove 4 to the second groove 5. The adhesive 13 then bleeds into and begins to fill the second groove 5. As the level of adhesive 13 in the second groove 5 rises, the level of adhesive 13 in the first groove 4 drops. The first groove 4 may therefore be regarded as a runner for the adhesive 13, and the second groove 5 may be regarded as a riser. As adhesive 13 continues to be injected into the first groove 4, the level of the adhesive 13 within the bore 3 and the grooves 4,5 rises. As the level of the adhesive 13 approaches the top of the bore 3, adhesive 13 begins to fill the chamfered portion of the bore 3. Injection of adhesive 13 into the first groove 4 is then halted. The net result is an even and continuous distribution of adhesive 13 between the bearing 12 and the wall 6 of the bore 3. Owing to the relatively small clearance between the bearing 12 and the bottom end 8 of the bore 3, no adhesive 13 seeps through the bottom of the bore 3. Finally, the adhesive 13 is cured. For this particular type of adhesive, curing is achieved by illuminating the top end 7 of the bore 3 with UV light. This then cures the adhesive 13 within the chamfered portion of the bore 3. The remainder of the adhesive 13 along the length of the bore 3 then cures anaerobically.

The bore 3 is dimensioned (i.e. has a diameter and degree of taper) such that a relatively small clearance is achieved between the wall 6 of the bore 3 and the bearing 12. This clearance should be sufficiently large to encourage wicking of the adhesive 13 while ensuring that no adhesive 13 seeps through the bottom of the bore 3. For many types of adhesive, it is possible to have a sizeable clearance between the bearing 12 and the wall 6 of the bore 3 without the adhesive seeping out through the bottom of the bore 3. However, as the size of the clearance increases, the amount of adhesive needed to secure the bearing 12 increases. Not only does this increase the cost of securing the bearing 12, but it also increases the length of time necessary to cure the adhesive 13. Accordingly, the clearance is ideally no bigger than that necessary to achieve acceptable wicking times. The dimension of the bore 3 and the resulting clearance with the bearing 12 will therefore depend upon the choice of adhesive and in particular the viscosity of the adhesive. By way of example only, a difference in the diameters of the bore 3 and bearing 12 of between 0.3 mm and 0.5 mm has been found to work well for an adhesive having a viscosity of between 400-600 mPa·s (Brookfield RVT, spindle 2 at 20 rpm, 25° C.).

The bearing support 1 of the present invention provides significant advantages over conventional means of securement. In contrast to press fitting, a bearing 12 may be secured within the bearing support 1 without the need for high-precision manufacturing. The bearing support 1 thus offers a cheaper method of securing and supporting a rotor 10. Furthermore, the bearing support 1 may be formed from materials and processes that would otherwise be precluded from use owing to the associated tolerances. In particular, the bearing support 1 may be formed of a plastic material using compression or injection moulding. The bearing support 1 therefore enables a rotor 10 to be supported and accurately aligned using cheaper materials and processes.

If the bearing 12 were secured within a conventional bore (i.e. a bore having no grooves), any adhesive injected into the top of the bore would wick slowly downwards. Indeed, owing to the wicking length associated with the adhesive, it may prove impossible to deliver adhesive along the full length of the bearing. In addition, the adhesive would most likely trap pockets of air resulting in incomplete and uneven distribution of adhesive. Once the bearing 12 is seated within the bore, it is not easy to rotate the bearing 12 in order to obtain a more even distribution of adhesive. In particular, any attempt to rotate the shaft 11 of the rotor 10 will only cause the inner race of the bearing 12 to rotate relative to the outer race. During subsequent use of the rotor 10, any uneven distribution of adhesive may result in failure of the adhesive, causing the bearing 12 to separate from the support.

With the bearing support 1 of the present invention, a more complete and even coverage of adhesive 13 is achieved. This is made possible through the provision of grooves 4,5, which act to deliver adhesive 13 to the bottom of the bore 3 and bearing 12. Since adhesive is delivered to the bottom of the bore 3, the adhesive 13 first wicks around the bottom of the bore 3. As the adhesive 13 wicks around the bore 3, the adhesive 13 drives out any air between the bearing 12 and the wall 6 of the bore 3. By injecting adhesive 13 into only one of the grooves 4, air is driven by the adhesive 13 both upwards and into the other groove 5, which then acts as a flue for the air. Consequently, no air is trapped by the adhesive 13. In addition to providing a more even coverage of adhesive 13, the time required for the adhesive 13 to wick between the bearing 12 and the wall of the bore 3 is significantly reduced.

The provision of a tapered bore 3 has two key benefits. First, by tapering the bore towards the bottom end 8 (i.e. the second end 8) of the bore 3, adhesive 13 rising within the bore 3 drives air upwards into an expanding volume and thus the risk of air entrapment is further reduced. Second, axial thrust acting on the rotor 10 creates a shearing force between the bearing 12 and the bearing support 1. By having a tapered bore 3, the cured adhesive 13 forms a wedge between the bearing 12 and the bearing support 1. This wedge then acts to oppose axial thrust operating in a direction from the top 7 to the bottom 8 of the bore 3. In spite of the aforementioned advantages, the taper in the bore 3 is not essential and may be omitted.

The chamfer 9 in the top end 7 (i.e. the first end 7) of the bore 3 similarly has two key benefits. First, the chamfer 9 acts as a reservoir for the rising adhesive 13. Consequently, tight control on the volume of adhesive 13 injected into the groove 4 is not required. Instead, a fixed volume of adhesive 13 can be injected into the groove 4 that achieves good coverage without the risk of adhesive 13 spilling out of the bore 3 and on to the bearing 12. This naturally has benefits for automated assembly. Second, movement of the bearing 12 relative to the bearing support 1 during curing is likely to result in a weak adhesive join. The chamfer 9 provides a region over which a portion of the adhesive 13 can be cured quickly and easily, e.g. by UV light. The adhesive cured within the chamfered portion 9 of the bore 3 then acts to hold the bearing 12 to the bearing support 1 while the remainder of the adhesive 12 within the bore 3 cures, e.g. anaerobically. Consequently, relative movement of the bearing 12 and bearing support 1, as the adhesive 13 within the bore 3 is curing, is prevented. Again, while the chamfer 9 in the wall 6 of the bore 3 has particular benefits, the provision of a chamfer 9 is not essential and may be omitted.

In the example illustrated in FIG. 3, the length of the bearing 12 is relatively short. However, the bearing support 1 of the present invention is of particular benefit in securing bearings of longer length, e.g. bearing assemblies, needle roller bearings, double row bearings. When securing a longer-length bearing into a conventional bore, the likelihood of trapped air increases, as does the time required for the adhesive to wick. Moreover, as already noted above, it may not be possible to deliver adhesive along the full length of the bearing owing to the limited wicking length associated with the adhesive. In contrast, the bearing support 1 of the present invention is not so restricted. The grooves 4,5 provide means by which adhesive 13 can be delivered to the bottom of the bore 3. Consequently, even for an adhesive having a wicking length shorter than that of the bearing length, it is still possible to achieve an even distribution of adhesive 13 along the full length of the bearing 12.

Figure 4:
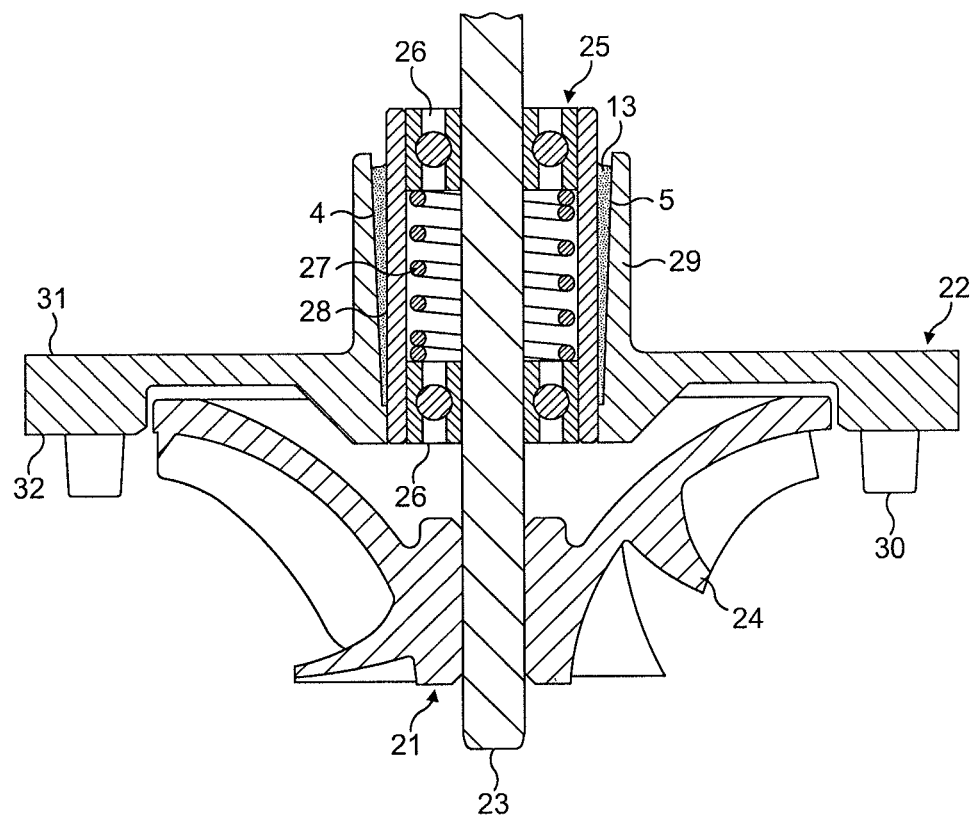
FIG. 4 is a sectional view of a compressor incorporating the bearing support of FIGS. 1 and 2.

The bearing support 1 may form any part of a structure to which a rotor is mounted. By way of example, FIG. 4 illustrates a compressor 20 in which the bearing support 1 forms an integral part of a diffuser 22. In addition to the diffuser 22, the compressor 20 comprises a rotor 21 rotatably mounted to the diffuser 22.

The rotor 21 comprises a shaft 23 to which are secured an impeller 24 and a bearing cartridge 25. The bearing cartridge 25 comprises a pair of spaced bearings 26 preloaded by a spring 27 and surrounded by a sleeve 28.

The diffuser 22 comprises a hub 29 around which a plurality of vanes 30 are circumferentially spaced. The hub 29 serves as the body 2 of a bearing support 1 and includes a central bore 3. The bore 3 extends from a first side 31 (e.g. the upper side) to a second side 32 (e.g. the lower side) of the hub 29, the vanes 30 being located on the second side 32 of the hub 29. The bore 3 is tapered towards the second side 32 of the hub 29, and is chamfered around the end adjacent the first side 31 of the hub 29. A pair of grooves 4,5 are formed along a wall 6 of the bore 3 and extend from a first end 7 of the bore 3 and terminate prior to a second end 8 of the bore 3. More particularly, each groove 4,5 extends from the first side 31 and terminates prior to the second side 32 of the hub 29.

The rotor 21 is mounted to the diffuser 22 in the manner described above with reference to FIG. 3. In particular, the rotor 21 and diffuser 22 are each held in one half of a jig. The two halves of the jig are aligned and brought together, thereby ensuring that the rotor 21 is accurately aligned relative to the diffuser 22. Adhesive 13 is then injected into one of the grooves 4. As the level of adhesive 13 rises and begins to fill the chamfered portion 9 of the bore 3, injection of adhesive 13 into the groove 4 is halted, and the adhesive 13 is cured.

The bearing cartridge 25, in having two spaced bearings 26, supports the rotor 21 over a relatively long length and thus provides good stability. Moreover, the sleeve 28 of the bearing cartridge 25 provides a single, relatively large surface over which the rotor 21 may be secured to the diffuser 22.

In providing a diffuser 22 that incorporates a bearing support 1, accurate alignment of the rotor 21 relative to the diffuser 22 is made much simpler. In particular, the rotor 21 can be secured directly to the diffuser 22 such that the rotor 21 and diffuser 22 are concentric. This in contrast in to other compressors in which the rotor is not directly secured to the diffuser and thus geometric tolerances may result in misalignment of the rotor and diffuser. Furthermore, in providing a diffuser 22 that serves as a bearing support 1, the manufacture and assembly of the compressor 20 is made both simpler and cheaper.

Each groove 4,5 extends from a first side 31 of the diffuser 22, while the vanes 30 are located on an opposite, second side 32 of the diffuser 22. Consequently, adhesive 13 is injected into the groove 4 from a side 31 of the diffuser 22 opposite to that on which the vanes 30 are located. This has the advantage that a rotor 21 having an impeller 24 may be secured to the diffuser 22. The rotor 21 may therefore be dynamically balanced as a complete unit before being secured to the diffuser 22. This is contrast to a compressor in which the shaft must first be secured to the diffuser and then the impeller is subsequently secured to the shaft.

During operation of the compressor 20, the rotor 21 experiences axial thrust due to pressure differentials between the two sides 31,32 of the diffuser 22 and between the front and rear sides of the impeller 24. The axial thrust acts on the rotor 21 in a direction from the first side 31 to the second side 32 of the diffuser 22 (i.e. in a downward direction for the compressor 20 illustrated in FIG. 4). By tapering the bore 3 in the diffuser 22, the cured adhesive 13 forms a wedge between the bearing cartridge 25 and the diffuser 22. Since the bore 3 is tapered towards the second side 32 of the diffuser 22, axial thrust on the rotor 21 is opposed by the wedge of adhesive 13.

In each of the embodiments described above, the bearing support 1 has only two grooves 4,5. Additional grooves may, however, be provided in the wall 6 of the bore 3. By providing additional grooves, adhesive 13 may be injected into more than one groove and thus adhesive delivery times may be shortened. This may prove particularly useful when using a relatively viscous adhesive or if the bore 3 and bearing 12 have relatively large surface areas. Although adhesive 13 may be injected into more than one groove, at least one groove is ideally precluded from adhesive injection so as to allow air to be driven into the precluded groove. Indeed, for each groove into which adhesive 13 is injected, an adjacent groove is ideally precluded from adhesive injection.

Although at least one groove is ideally precluded from adhesive injection, adhesive 13 may nevertheless be injected into all grooves 4,5 of the bearing support 1. This continues to provide the benefit of delivering adhesive 13 to the bottom of the bore 3. The adhesive 13 then wicks around the bottom of the bore 3, and as more adhesive 13 is injected, the level of adhesive 13 rises within the bore 3 thereby driving air out. However, injecting adhesive 13 into all grooves 4,5 may increase the risk of air entrapment, particularly if the adhesive 13 has a relatively high viscosity. Any increased propensity to air entrapment may be addressed by injecting the adhesive 13 into the grooves 4,5 at a slower rate (thereby giving the adhesive 13 sufficient time to wick fully around the bore 3 before the level of adhesive 13 rises) or by increasing the clearance between the bearing 12 and the wall 6 of the bore 3 (e.g. by increasing the diameter and/or the degree of taper in the bore 3).

Figure 5:
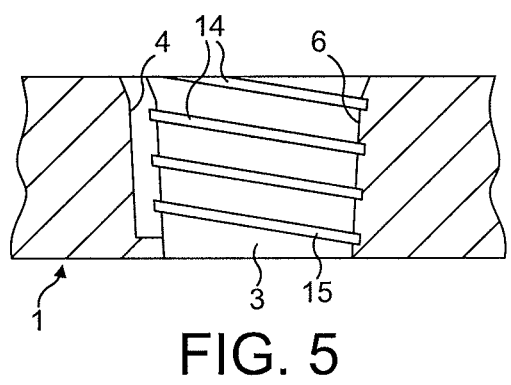
FIG. 5 is a sectional view of an alternative bearing support in accordance with the present invention.

In additional to longitudinal grooves 4,5, the bearing support 1 may include one of more channels 14 that extend around the wall 6 of the bore 3 between adjacent grooves 4,5. By way of example, FIG. 5 illustrates a bearing support 1 in which a screw thread 15 is formed in the wall 6 of the bore 3. With the exception of the screw thread 15, the bearing support 1 is identical to that described above and illustrated in FIGS. 1 and 2. Indeed, FIG. 5 represents a sectional view of the bearing support 1 taken along the line X-X of FIG. 1. The screw thread 15 serves to define a plurality of channels 14 that extend around the wall 6 of the bore 3 between of the two grooves 4,5.

The channels 14 provide several advantages. First, following manufacture of the bearing support 1, the surface of the wall 6 of the bore 3 can be relatively smooth. This is particularly true when the bearing support 1 is manufactured from moulded plastic. By forming one or more channels 14 in the wall 6 of the bore 3 following manufacture, the surface of the wall 6 is roughened and the adhesive area is increased. As a result, a stronger joint is formed between the bearing support 1 and the adhesive 13. Second, the channels 14 provide an anchorage for the adhesive 13 and thus the adhesive joint is better able to resist axial forces acting between the bearing 12 and bearing support 1. Third, the channels 14 provide passageways for the adhesive 13 to wick around the bore 3. Consequently, shorter wicking times can be achieved and the risk of air entrapment may be reduced.

The provision of channels 14 naturally increases the volume of adhesive 13 required to form the joint between the bearing 12 and bearing support 1. Since the primary purpose of the channels 14 is to roughen the surface of the wall 6, each channel 14 preferably has a depth less than that of the grooves 4,5. Accordingly, the aforementioned advantages may be obtained without unduly increasing the volume of adhesive 13.

With the bearing support 1 of the present invention, a rotor 10,21 may be secured in a manner that ensures accurate alignment without the need for high-precision manufacturing. The bearing support 1 thus provides a cheaper means for securing a rotor 10,21 without compromising on alignment. Moreover, the bearing support 1 ensures that a complete and even distribution of adhesive 13 between the support 1 and a bearing 12,25 of the rotor 10,21 may be achieved over a relatively short timescale.

The invention claimed is:

1. An assembly comprising a bearing secured within a diffuser, the diffuser comprising a hub around which a plurality of vanes are circumferentially spaced, a bore extends through the hub and a plurality of grooves are formed in a wall of the bore, each groove extending from a first end of the bore and terminating prior to a second end of the bore, the bore is dimensioned such that a clearance exists between the bearing and the wall of the bore, the bearing is arranged within the bore such that the bearing extends through at least a region of the bore in which the grooves are formed and through at least a region of the bore between the termination of the grooves and the second end of the bore, and the bearing is secured within the bore by adhesive located within the clearance between the bearing and the wall and within the grooves.

2. An assembly as claimed in claim 1, wherein the bore extends from a first side of the hub to a second side of the hub, each groove extends from the first side and terminates prior to the second side, and the diffuser comprises a plurality of vanes located on the second side of the hub.

3. An assembly as claimed in claim 1, wherein the bore is tapered towards the second side of the hub.

4. An assembly comprising a bearing secured within a bearing support, the bearing support comprising a body through which a bore extends and a plurality of grooves formed in a wall of the bore, wherein each groove extends from a first end of the bore and terminates prior to a second end of the bore, the bore is dimensioned such that a clearance exists between the bearing and the wall of the bore along the length of the bearing, and the bearing is arranged within the bore such that the bearing extends through at least a region of the bore in which the grooves are formed and through at least a region of the bore between the termination of the grooves and the second end of the bore, and the bearing is secured within the bore by adhesive located within the clearance and within the grooves.

5. A compressor comprising a rotor mounted to a diffuser, the rotor comprising a shaft to which are mounted an impeller and a bearing, and the diffuser comprises a hub through which a bore extends and a plurality of grooves formed in a wall of the bore, wherein each groove extends from a first end of the bore and terminates prior to a second end of the bore, the bearing extends between the first end and the second end of the bore such that the bearing extends through at least a region of the bore in which the grooves are formed and through at least a region of the bore between the termination of the grooves and the second end of the bore, and the bearing is secured within the bore by adhesive located between the bearing and the wall and within the grooves.

6. A compressor as claimed in claim 5, wherein the bearing is a bearing cartridge comprising a pair of spaced bearings surrounded by a sleeve, and the adhesive is located between the sleeve and the wall.

7. A method of securing a bearing to a support, the method comprising:
providing a bearing support, the bearing support comprising a body through which a bore extends and a plurality of grooves formed in a wall of the bore, each groove extending from a first end of the bore and terminating prior to a second end of the bore;
inserting a bearing into the bore, such that the bearing extends through at least a region of the bore in which the grooves are formed and through at least a region of the bore between the termination of the grooves and the second end of the bore; and
injecting adhesive into one or more of the grooves such that the adhesive fills from the second end towards the first end of the bore.

8. A method as claimed in claim 7, wherein the bore is dimensioned so as to permit wicking of the adhesive between the bearing and the wall.

9. A method as claimed in claim 7, wherein at least one groove is precluded from adhesive injection.

10. A method as claimed in claim 9, wherein for each groove into which adhesive is injected, an adjacent groove is precluded from adhesive injection.

11. A method of securing a bearing to a support, the method comprising:
providing a bearing support, the bearing support comprising a body through which a bore extends and a plurality of grooves formed in a wall of the bore, each groove extending from a first end of the bore and terminating prior to a second end of the bore;
inserting a bearing into the bore; and
injecting adhesive into one or more of the grooves,
wherein at least one groove is precluded from adhesive injection.

12. A compressor comprising a rotor mounted to a diffuser, the rotor comprising a shaft to which are mounted an impeller and a bearing, and the diffuser comprises a hub through which a bore extends and a plurality of grooves formed in a wall of the bore, wherein each groove extends from a first end of the bore and terminates prior to a second end of the bore, the bearing extends the full length between the first end and the second end of the bore and is secured within the bore by adhesive located between the bearing and the wall and within the grooves.

* * * * *